US010573081B2

(12) United States Patent
 Tomizuka

(10) Patent No.: US 10,573,081 B2
(45) Date of Patent: Feb. 25, 2020

(54) AUTHORING VIRTUAL AND AUGMENTED REALITY ENVIRONMENTS VIA AN XR COLLABORATION APPLICATION

(71) Applicant: TAQTILE, INC., Seattle, WA (US)

(72) Inventor: John Tomizuka, Seattle, WA (US)

(73) Assignee: TAQTILE, INC., Seattle, WA (US)

( * ) Notice: Subject to any disclaimer, the term of this patent is extended or adjusted under 35 U.S.C. 154(b) by 0 days.

(21) Appl. No.: 16/054,975

(22) Filed: Aug. 3, 2018

(65) Prior Publication Data
US 2019/0043264 A1 Feb. 7, 2019

Related U.S. Application Data

(60) Provisional application No. 62/541,014, filed on Aug. 3, 2017.

(51) Int. Cl.
 *G06T 19/00* (2011.01)
 *H04L 29/06* (2006.01)
 *G06F 3/01* (2006.01)

(52) U.S. Cl.
 CPC ............ *G06T 19/006* (2013.01); *G06F 3/017* (2013.01); *G06T 19/003* (2013.01); *H04L 67/38* (2013.01)

(58) Field of Classification Search
 CPC ..... G06T 19/003; G06T 19/006; H04L 67/38; G06F 3/017
 See application file for complete search history.

(56) References Cited

U.S. PATENT DOCUMENTS

| 2002/0069072 A1* | 6/2002 | Friedrich | G05B 19/409 704/275 |
| 2012/0256886 A1* | 10/2012 | Ryu | G06F 1/1632 345/204 |
| 2017/0169610 A1* | 6/2017 | King | G02B 27/017 |

OTHER PUBLICATIONS

Rekimoto et al. "Augment-able reality: Situated communication through physical and digital spaces." Digest of Papers. Second International Symposium on Wearable Computers (Cat. No. 98EX215). IEEE, 1998.*

* cited by examiner

*Primary Examiner* — Ke Xiao
*Assistant Examiner* — Jed-Justin Imperial
(74) *Attorney, Agent, or Firm* — Han Santos, PLLC; Gloria M. Steinberg

(57) ABSTRACT

This disclosure describes techniques that facilitate generating or modifying a template application that provides an application user with interactive experience within a Virtual Reality (VR) environment, an Augmented Reality (AR) environment, or a combination of both (i.e. MR environment). Moreover, this disclosure describes an XR collaboration system that permits an XR author to generate or modify an XR template that is presented to an application user via XR environment-enabled client device. Specifically, an XR author may use the XR collaboration application to add, change, or remove markers within an XR template along with associated virtual content. Further, the XR author may configure appearance criteria associated with markers to control the criteria and sequential order that markers may appear within an XR environment. Similarly, activation criteria may control the appearance and sequential order of virtual content that is associated with markers within the XR environment.

14 Claims, 6 Drawing Sheets

AUTHORING VIRTUAL AND AUGMENTED REALITY ENVIRONMENTS VIA AN XR COLLABORATION APPLICATION

RELATED APPLICATION

This application claims priority to a commonly owned U.S. Provisional Patent Application No. 62/541014 filed on Aug. 3, 2017 and titled "Authoring tool for virtual and augmented reality environments," which is herein incorporated by reference in its entirety.

BACKGROUND

Presently, consumers may experience several different modes of virtual experiences via appropriately enabled client devices. In one example, a user experience may derive solely from computer-generated content executed via a Virtual Reality (VR) enabled device. In another example, the user experience may derive from virtual content that overlays real-world content via an Augmented Reality (AR) device. In other words, the user experience may comprise of a real-world experience that is augmented to include at least some computer-generated content. In yet another example, a user experience may derive from a combination of VR and AR, generally denoted as Mixed Reality (MR).

However, despite an ability to integrate real-world and virtual content into a virtual environment (i.e. VR, AR, or MR), virtual content that is displayed within one virtual environment (i.e. VR, AR, or MR) may be incompatible for display within a different virtual environment (i.e. AR, MR, or VR). Thus, content authors are tasked with an additional burden of generating multiple versions of a same piece of virtual to ensure display compatibility within multiple virtual environments (i.e. VR, AR, and MR).

Further, there remains an additional need to allow content authors to efficiently define virtual content and related actions that allow for the creation and modification of workflow applications with multiple virtual environments.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
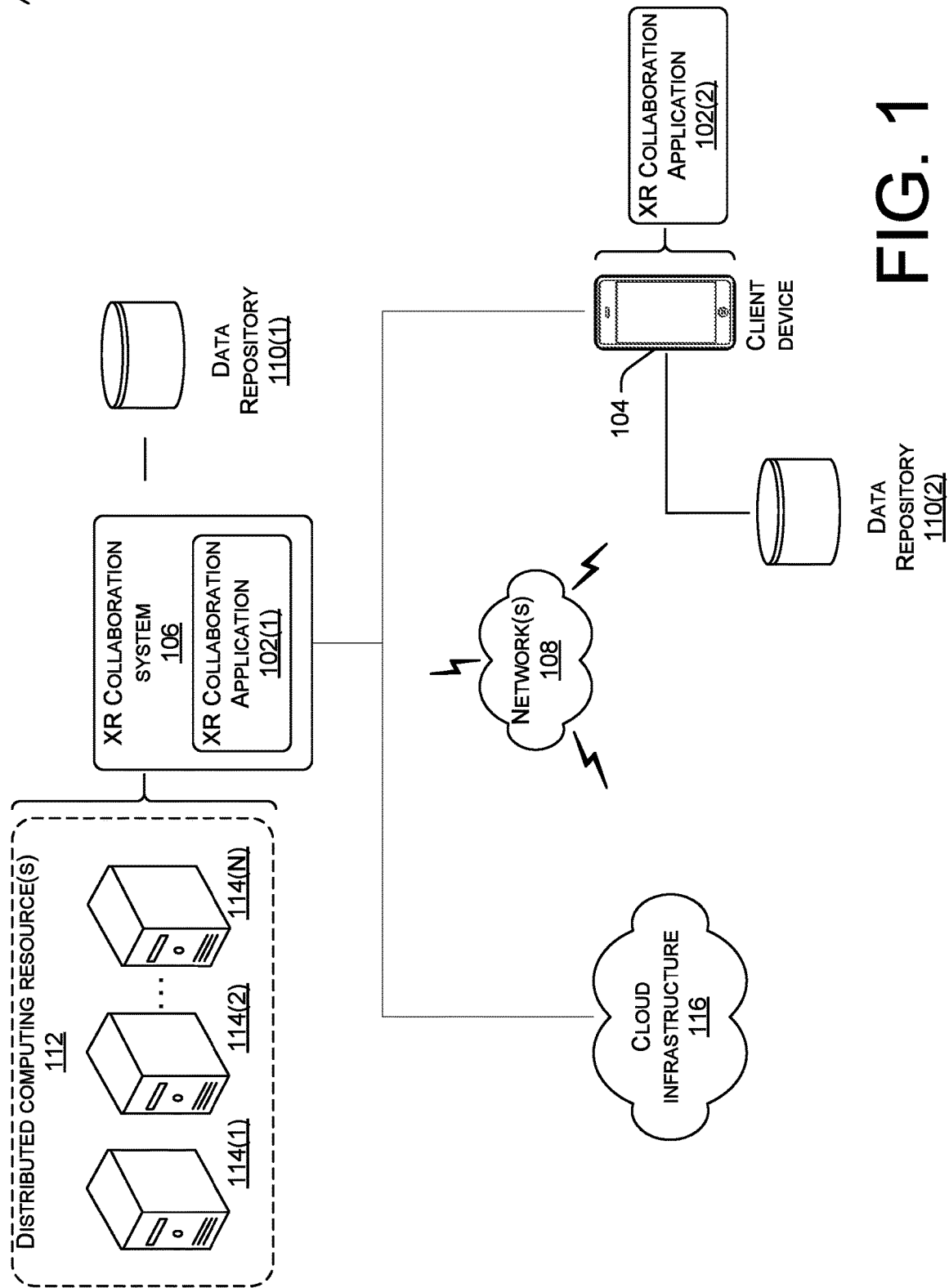
FIG. 1 illustrates an exemplary environment for implementing an XR collaboration application.

This disclosure describes techniques that facilitate generating and modifying an interactive experience within a Virtual Reality (VR) environment, an Augmented Reality (AR) environment, or a combination of both (i.e. MR environment). For the sake of clarity, a pseudo-acronym "XR" has been defined to represent a plurality of different modes that application users may experience virtual reality. For example, XR modes may include a Virtual Reality (VR) mode, an Augmented Reality (AR) mode, and a Mixed Reality (MR) mode. The VR mode describes an interactive computer-generated experience within a simulated environment. In other words, the VR mode represents fully computer-generated content that appears to surround the user. The VR mode may include multiple sensory modalities such as visual, auditory, haptic, olfactory, or any combination thereof. The AR mode describes an interactive experience that overlays computer-generated content within a real-world environment. More specifically, rather than replacing the real-world environment with a simulated adaptation, the AR mode constructively (i.e. additive to the real-world environment) or destructively (i.e. masking of the real-world environment) overlays virtual content onto physical objects that reside in the real world. In some examples, virtual content may include multiple sensory modalities such as visual, auditory, haptic, olfactory, or any combination thereof In some examples, virtual content may include text or audio annotations that provide an application user with direction and/or instruction, as it relates to the marker. The MR mode describes a merging of real-world and simulated environments to produce a "mixed" environment whereby physical and virtual objects co-exist and interact in real-time.

The term "application user" as used throughout the disclosure is intended to describe an individual user who is interacting with an XR template via their respective client device. For example, an application user may be an engineer receiving service instructions to maintain complex machinery, such as a Mud Pump, via an XR environment-enabled client device. In contrast, the term "XR author" as used throughout the disclosure is intended to describe a subject matter expert who interacts with the XR collaboration application to generate and manipulate virtual content or markers, such as pins.

Further, the term "XR template" as used throughout this disclosure is intended to describe a predetermined XR environment. In one example, an XR template may relate to a geographic region, whereby an application user may interact with virtual and physical objects within the geographic region. In another example, an XR template may correspond to a particular physical object, whereby an application user may access virtual content related specifically to the physical object or components thereof. For example, an XR template may correspond to a complex machinery, such as a Mud Pump, and the virtual content within the XR template may mark componentry of the Mud Pump and further provide virtual content that specifies maintenance instructions. Thus, an application user accessing the XR template may be guided through the process of maintaining the Mud Pump through an interaction with a sequence of markers and each marker's corresponding virtual content.

More specifically, this disclosure describes an XR collaboration application that permits an XR author to generate or modify an XR template that is presented to an application user via XR environment-enabled client device. An XR author may use the XR collaboration application to add, change, or remove markers within an XR template along with each marker's associated virtual content. Further, the XR author may configure appearance criteria associated with markers to control when markers display within an XR environment. Appearance criteria may further control the sequential order that multiple markers may appear within the XR environment. Moreover, the XR author may further configure activation criteria associated with virtual content to control when the virtual content associated with a marker is displayed within the XR environment.

By way of example, consider an XR author who, via an XR collaboration application, generates an XR template that is intended to train an application user on how to maintain complex machinery, such as a Mud Pump. In this example, the XR author may associate virtual content with componentry of the Mud Pump. The virtual content may provide a checklist of instruction for maintaining the Mud Pump. In various examples, the virtual content may include visual data (i.e. text or graphical data) that describe the checklist of instructions. Alternatively, or additionally, the virtual content may be defined as an alternative sensory modality, such as an auditory modality.

The XR collaboration application may permit an XR author to associate one or more markers with physical objects and virtual objects within the XR environment. A marker may correspond to a graphical representation, such as a pin, that visually overlays a real-world or virtual-world object within the XR environment.

In one example, the XR collaboration application may detect and recognize particular gestures performed by an XR author that indicate an intention to add, modify or delete an association between a marker and a physical object within an XR environment. For example, a first hand-gesture (i.e. a swiping hand motion from left to right) may indicate that the XR author intends to add a marker, while a second hand-gesture (i.e. a swiping hand motion from right to left) may indicate that XR author intends to remove a marker. Any combination of gestures is possible.

In various example, the XR collaboration application may facilitate an XR author in associating a marker with physical objects, virtual objects, or environmental data captured within the XR environment. Environmental data may include geographic location data, ambient noise data, ambient light data, ambient temperature data, ambient moisture data, ambient odor data, or any other pertinent data. In one example, an XR template may be configured such that in response to detecting a rise in temperature within an XR environment, the XR template may trigger the presentation of virtual content. Continuing with the Mud Pump example, the virtual content may comprise of a temperature rise warning or an alternate set of maintenance steps that are congruent with the elevated temperature condition.

While the XR collaboration system may define a marker within a visual sensory modality (i.e. a pin), the XR collaboration system may further facilitate an XR author to define a marker within alternate sensory modalities, such as auditory, haptic, olfactory, or any combination thereof. For example, rather than configuring the XR template to visually present a pin that overlays a real-world object, the marker may comprise of an audible message, a sequence of haptic vibrations, or an odor that is presented based on fulfillment of appearance criteria.

In various examples, an XR author may set appearance criteria that control the presentation of a marker within the XR environment. Appearance criteria may cause a marker to become visible or remain visible based on fulfillment of a predetermined condition. The predetermined condition may be set by the XR author and may be based on threshold environmental data, such as a threshold temperature, a threshold noise level, a threshold light intensity, a threshold moisture level, a threshold odor intensity, or any other pertinent data. Alternatively, or additionally, the predetermined condition may be based on an application user being within a predetermined proximity of a physical object within the XR environment.

Moreover, the XR author may set appearance criteria to control the order that one or more markers display within an XR environment. In other words, appearance criteria may indicate that one marker may only appear in response to a prerequisite marker having been activated and its respective virtual content, viewed. Further, appearance criteria may be based on one or more other factors such as a time of day, environmental conditions (i.e. temperature, moisture, weather, or environmental conditions), olfactory data, or any other pertinent data that the XR author has elected to associate with the presentation of the marker. For example, an XR author may generate appearance criteria that cause the presentation of a marker in response to an application user's proximity to a physical object and corresponding olfactory data that detects toxic or dangerous fumes (i.e. situational awareness). In this example, the mere proximity of the application user to the physical object may not trigger a presentation of the marker within the XR environment, however the combined detection of olfactory data that identifies toxic or dangerous fumes—for example—may represent a situational awareness that triggers the presentation of the pin within the XR environment.

Following the appearance of a marker within an XR environment, the XR collaboration application may facilitate the XR author in associating virtual content with one or more markers within an XR template, and further defining activation criteria that control a display of the virtual content within the XR environment. In other words, an XR author may determine when virtual content that is associated with a marker is displayed within the XR environment. In some examples, the XR author may configure an activation criterion as a display of an associated marker within the XR environment. In other words, the virtual content associated with a marker may appear automatically in response to the display of a marker within the XR environment. Alternatively, or additionally, activation criteria may correspond to a gesture performed by an application user that is interacting with an XR template within the XR environment. For example, the gesture may correspond to an audible command or physical motion carried out by an application user. The physical motion may be a hand motion, a leg/foot motion, an eyelid motion, or a combined sequence or frequency thereof. The gesture may be captured by an XR environment-enabled client device associated with the application user. In any case, the XR author may generate the activation criteria in real-time by performing the gestures via an XR environment enabled client devices when defining the XR template. The XR collaboration application may capture the gesture, as performed by the XR author and update the XR template to include gesture as an activation criterion as it relates to a select item of virtual content.

In some examples, an XR author may configure activation criteria to reveal virtual content, forgo a presentation of virtual content, or dismiss a presentation of a marker, altogether. In this way, the XR collaboration application may facilitate an XR author to configure an XR template to detect and analyze an application user's gesture (i.e. activation criteria) and further determine whether the gesture is an indicator to revealing virtual content, forgoing a presentation of virtual content, or dismissing a marker altogether.

Moreover, while activation criteria may correspond to a gesture performed by an application user, other types of activation criteria are possible. For example, activation criteria may be based on one or more of an audible command, time of day, temperature data, light intensity data, moisture data, noise data, weather data, odor data, or any other form pertinent data deemed relevant by an XR author. It is noteworthy that some of the activation criteria indicated above are independent of an application user's actions (i.e. time of day, temperature data and/or so forth), and thus corresponding virtual content may be revealed irrespective of the application user's intentions.

It is noteworthy that the XR author may create or modify an XR template via XR environment-enabled client device. The XR author may create or modify an XR template by performing gestures recognized by the XR environment-enabled client device, such as a swiping gesture or an audible gesture. Alternatively, or additionally, the XR author may interact with a virtual menu accessible via the XR collaboration application. The virtual menu may allow the XR author to perform a gesture to drag and drop virtual content from the virtual menu of available resources. Similarly, the XR author may perform a gesture that is captured by the XR author's XR environment-enabled client device to associate appearance criteria (i.e. associated with markers) and activation criteria (i.e. associated with virtual content), with an XR template.

The updated XR template may be stored on an XR author's client device and contemporaneously uploaded to a remote server or cloud infrastructure. In this way, other XR authors are provided an opportunity to refine the updated XR template, while application users are also provided an opportunity to use the updated XR template.

In response to generating an XR template, the XR collaboration application may further support an application user's use of the XR template within an XR environment. In one example, the XR collaboration application may monitor an application user's interaction with an XR template within an XR environment and dynamically select virtual content based on a situational awareness of the application user's interaction. Situational awareness may reflect a change in environmental data that necessitates a warning to the application user, or an alternate set of virtual content, altogether.

For example, consider an example of an application user performing maintenance steps on a Mud Pump using a checklist of instructions annotated within an XR template. More specifically, XR template may include instances of virtual content that each describes a maintenance step, and whereby each instance of virtual content is activated in an order consistent with the order that the maintenance steps are to be performed. For example, the virtual content associated with maintenance step B may only appear in response to an indication that the prerequisite virtual content for maintenance step A has been activated and viewed.

In this example, the XR collaboration application may monitor the application user's interaction with a physical object (i.e. Mud Pump) or virtual object within the XR environment. The physical object may be associated with a marker which is further associated with virtual content describing instructions to maintain the Mud Pump. In this way, the XR collaboration application may employ one or more trained machine learning algorithms to analyze the application user's actions and further determine whether those actions are consistent with a current maintenance step (i.e. active virtual content) associated with the Mud Pump (i.e. marker). The one or more machine learning algorithms may make use of supervised learning, unsupervised learning, semi-supervised learning, naive Bayes, Bayesian networks, decision trees, neural networks, fuzzy logic models, multiclass decision forest, and/or probabilistic classification models.

The XR collaboration application may perform the analysis of the application user's interaction by first accessing a record of the maintenance step being performed by an XR author at a point in time that the XR template was generated. The record may capture changes in the physical object that are consistent with the performance of each maintenance step, or a motion of the XR author or other personnel while performing the maintenance step at a point in time that the XR template was being generated. In doing so, the XR collaboration application may correlate the current application user's movements within the XR environment with those recorded when the XR template was generated. In response to identifying an inconsistency, the XR collaboration application may compare the applications user's actions with other instances of recorded maintenance steps that reflect different sequences of performing maintenance instructions. Once the application user's actions have been correlated with a recorded instance, the XR collaboration application may dynamically and in real-time, present the application user with virtual content that guides the application user through a sequence of alternate instructions that correct the initial improper performance of instructions.

In some examples, the XR collaboration application may contemporaneously monitor environmental data associated with an application user's XR-environment enabled client device, while the application user is interacting within the XR environment. In doing so, the XR collaboration application may determine whether a change in environmental data may warrant a change in virtual content being presented to the application user. For example, continuing with the Mud Pump example, the environmental data may indicate a temperature rise that is above a predetermined temperature threshold. The predetermined temperature threshold may be set by the XR author while creating or updating the XR template. In doing so, the XR collaboration application may present an alternate set of virtual content that warns the application user of the elevated temperature or provides an alternate set of virtual content (i.e. maintenance instructions) that is congruent with the elevated temperature conditions, or a combination of both.

Additionally, the XR collaboration system may be configured to simplify the proliferation of virtual content to physical objects and virtual objects within an XR environment. In one example, an XR template, or a portion thereof, may be defined as an asset class that includes virtual content, appearance criteria, and activation criteria that relate to a common marker (i.e. physical object). A common marker may correspond to instances of the same type of physical object or virtual object. An asset class may be used to group together virtual content and corresponding criteria for reuse within an XR template or between different XR templates. In this way, the XR collaboration system may simplify how an asset may be distributed among XR templates or distributed at multiple locations (i.e. associated with multiple physical objects) within an XR template.

Continuing with the Mud Pump example, an asset class may be defined for maintenance instructions of a model 'A' Mud Pump. In this way, multiple instances of the asset class may be assigned to model 'A' Mud Pumps within a company's inventory. This allows for duplication of all, or a select portion of, asset class data (i.e. markers, virtual content, appearance and activation criteria) across multiple objects without having to duplicate the effort of creating and modifying an initial XR template.

In some examples, a sub-asset class may be created to account for variations in a type of physical object or virtual object within an XR environment. For example, maintenance instructions of a model 'B' Mud Pump may be reflected by a model 'A' asset class along with a model 'B' sub-asset class that accounts from differences between Model 'A' and Model 'B'. Further, the XR collaboration system may further accommodate the use of third-party XR templates. In this example, a third party XR template may act as a baseline XR template upon which an XR template may modify virtual content and corresponding markers.

Further, the term "techniques," as used herein, may refer to system(s), method(s), computer-readable instruction(s), module(s), algorithms, hardware logic, and/or operation(s) as permitted by the context described above and through the document.

FIG. 1 illustrates an exemplary environment for implementing an XR collaboration application. In the illustrated example, the XR collaboration application 102 may be executable via one or more hardware, software, or communication environments, each of which enables the development of content within an XR environment. In one example, the XR collaboration application 102 may be implemented on a stand-alone client device 104 associated with a user developing content for the XR environment. The client device 104 may include any sort of electronic device, such as a cellular phone, a smartphone, a tablet computer, an electronic reader, a media player, a gaming device, a personal computer (PC), a laptop computer, a voice-controlled device, a computing device(s) that facilitate an augmented reality platform and/or a virtual reality platform etc.

Alternatively, the XR collaboration application 102 may reside on a remote server, identified as the XR collaboration system 106 in FIG. 1, that is accessible by the client device 104 via one or more network(s) 108. More specifically, the XR collaboration system 106 may be configured execute the XR collaboration application 102 based on inputs received from a client device 104 that is communicatively coupled via one or more network(s) 108. In this example, the client device 104 may capture inputs from an XR author or application user and further communicate the inputs to the XR collaboration system 106. In doing so, the XR collaboration system 106 may generate an updated XR template based on inputs received from an XR author or reveal markers or virtual content within an XR template based on inputs received from an application user.

In various examples, the XR collaboration system 106 may have access to a data repository 110, where updates to XR templates may be stored. The data repository 110 may correspond to a third-party data store of XR templates that may be used to simplify the creation or modification of markers and their corresponding virtual content. In a non-limiting example, a manufacturer of a product, such as a Mud Pump, may provide an XR template that associates markers with the Mud Pump itself, or components thereof. Each marker may further include virtual content such as annotations that the manufacturer may consider as baseline maintenance steps. Thus, the XR collaboration system 106 may retrieve and use third-party XR templates as a baseline for XR authors to annotate more detailed markers, virtual content, or a combination of both.

The XR collaboration system 106 may operate on one or more distributed computing resource(s) 112. The one or more distributed computing resource(s) 112 may include one or more computing device(s) 114(1)-114(N) that operate in a cluster or other configuration to share resources, balance load, increase performance, provide fail-over support or redundancy, or for other purposes. The one or more computing device(s) 114(1)-114(N) may include one or more interfaces to enable communications with other networked devices, such as the client device 104 via the one or more network(s) 108. The one or more network(s) 108 may include public networks such as the Internet, private networks such as an institutional and/or personal intranet, or some combination of private and public networks. The one or more network(s) 108 can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof In another example, the XR collaboration application 102 may be hosted on the internet via cloud infrastructure 116. The cloud infrastructure 116 may represent a plurality of disaggregated servers which provide virtual web application server functionality and virtual database functionality. Cloud services may be accessible via the cloud infrastructure 116. The cloud infrastructure 116 may not only provide access to cloud services but also other enterprise services, such as billing services. Further, cloud infrastructure 116 may provide additional service abstractions such as Platform as a Service ("PAAS"), Infrastructure as a Service ("IAAS"), and Software as a Service ("SAAS"). Further, the cloud infrastructure 116 may be used to store third-party XR templates used via the XR collaboration application 102.

In the illustrated example, the client device 104 may include an XR application interface that may provide an XR author with a User Interface (UI) capable of facilitating the creation and modification of markers and virtual content within the XR environment. In this way, the client device 104 is configured to interact with an Application Programming Interface (API) of the remote server, which receives requests and sends responses.

Alternatively, or additionally, the client device 104 may include an instance of the XR collaboration application 102 that may operate independently of the XR collaboration system 106 or cloud infrastructure 116. In this example, the client device 104 may generate an updated XR template based on an XR author's inputs and further locally store the updated XR template within a data store of the client device 104. In some examples, the client device 104 may upload an updated XR template to the XR collaboration system 106 or cloud infrastructure 116 contemporaneously with its local storage on the client device 104 or at a later time based on a predetermined schedule. By making the updated XR template available at the XR collaboration system 106 or cloud infrastructure 116, the XR author associated with the client device 104 ensures that the updated XR template is made available to other XR authors or application users for further use or refinement.

The client device 104 may include any sort of electronic device, such as a cellular phone, a smartphone, a tablet computer, an electronic reader, a media player, a gaming device, a personal computer (PC), a laptop computer, a voice-controlled device, a computing device(s) that facilitate an augmented reality platform and/or a virtual reality platform etc.

Figure 2:
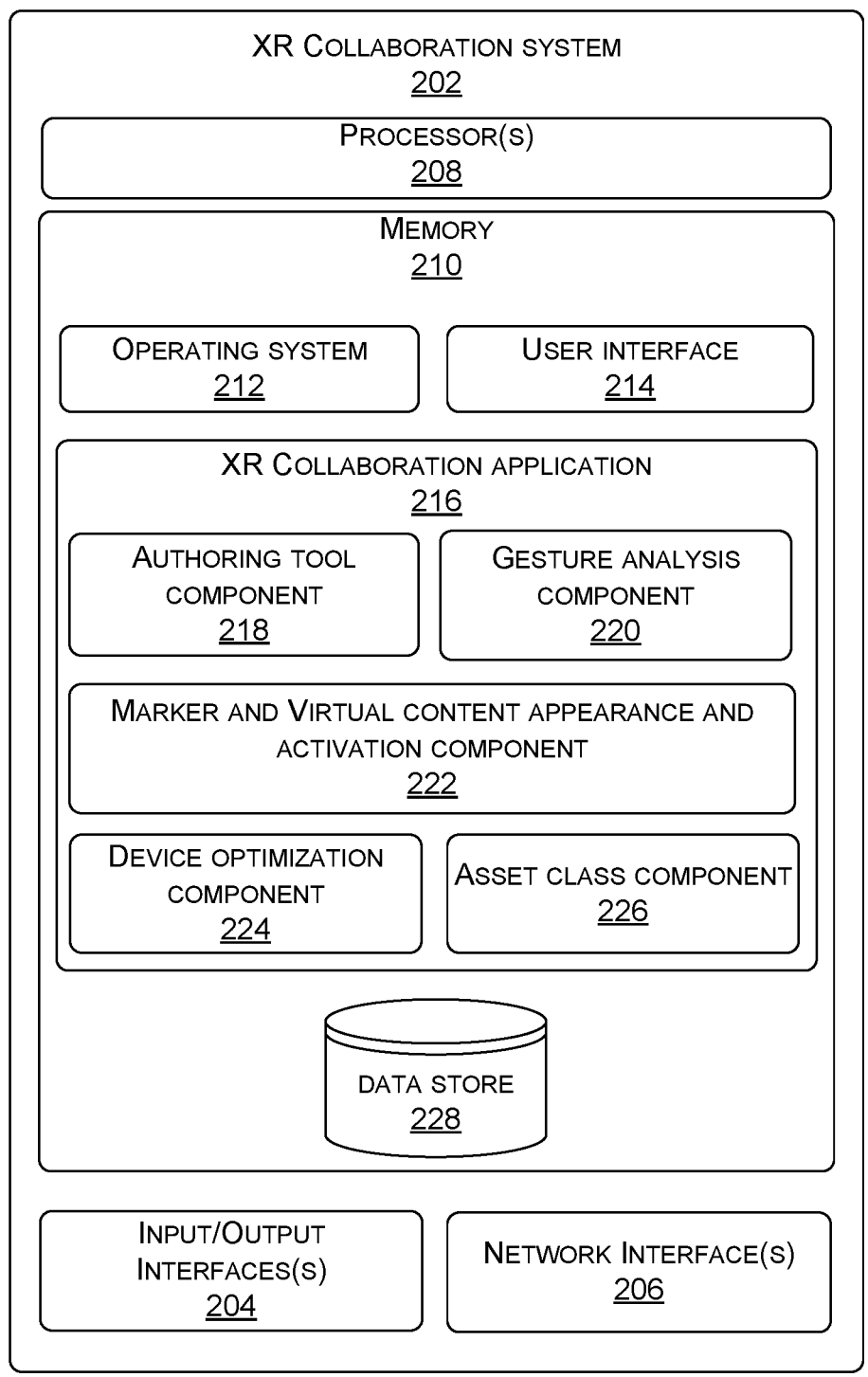
FIG. 2 illustrates a block diagram of various components of an XR collaboration system.

FIG. 2 illustrates a block diagram of various components of an XR collaboration system 202. The XR collaboration system 202 may include routines, program instructions, objects, and/or data structures that perform tasks or implement abstract data types. Further the XR collaboration system 202 may include input/output interface(s) 204. The input/output interface(s) 204 may include any type of output interface known in the art, such as a display (e.g. a liquid crystal display), speakers, a vibrating mechanism, or a tactile feedback mechanism. Input/output interface(s) 204 also include ports for one or more peripheral devices, such as headphones, peripheral speakers, or a peripheral display. Further, the input/output interface(s) 204 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like. Further, the input/output interface(s) 204 may facilitate client and system interactions via an augmented reality platform, a virtual reality platform, a voice-controlled platform, or any combination thereof Additionally, the XR collaboration system 202 may include one or more network interface(s) 206. The network interface(s) 206 may include any sort of transceiver known in the art. For example, the network interface(s) 206 may include a radio transceiver that performs the function of transmitting and receiving radio frequency communications via an antenna. In addition, the network interface(s) 206 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 206 may include wired communication components, such as an Ethernet port or a Universal Serial Bus (USB).

Further, the XR collaboration system 202 may include one or more processor(s) 208 that are operably connected to memory 210. In at least one example, the one or more processor(s) 208 may be a central processing unit(s) (CPU), graphics processing unit(s) (GPU), both a CPU and GPU or any other sort of processing unit(s). Each of the one or more processor(s) 208 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 208 may also be responsible for executing all computer applications stored in the memory, which can be associated with common types of volatile (RAM) and/or non-volatile (ROM) memory.

In some examples, memory 210 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 210 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 210 may include several software components including an operating system 212, a user interface 214, and an XR collaboration application 216. In general, the software components may be a set of computer-executable instructions stored together as a discrete whole. For example, software components may include binary executables such as static libraries, dynamically linked libraries, executable programs, interpreted executables that are executed on a runtime such as servlets, applets, p-Code binaries, and JAVA binaries. Software components may run in kernel mode, user mode, or a combination of both. The operating system 212 may be used to implement the XR collaboration application 216 and may be any operating system capable of managing computer hardware and software resources.

The XR collaboration application 216 may further comprise an authoring tool component 218, a gesture analysis component 220, an appearance and activation criteria component 222, a device optimization component 224, an asset class component 226, and a data store 228.

The authoring tool component 218 may create and modify an XR template, including the placement of markers within an XR environment and authoring of virtual content associated with each of the markers. The authoring tool component 218 may further identify alternate virtual content for presentation to an application user in response to a determination that the application user's actions are inconsistent with a prescribed sequence of instructions described within an initial set of virtual content.

The gesture analysis component 220 may capture and quantify a gesture performed by an XR author or application user via an XR environment-enabled client device. In some examples, the gesture analysis component 220 may incorporate a captured gesture as part of an XR template. In other examples, a captured gesture may be compared against stored gestures within an XR template to determine whether the gesture in an indicator for revealing virtual content, forgoing a presentation of virtual content, or dismissing a marker altogether.

Moreover, the gesture analysis component 220 may also monitor an application user's interaction within an XR environment. Specifically, the gesture analysis component 220 may employ one or more trained machine learning algorithms to analyze the application user's actions and further determine whether those actions are consistent instructions annotated or recorded within corresponding virtual content.

The appearance and activation criteria component 222 may generate appearance criteria that are associated with markers and activation criteria that are associated with the virtual content of an XR template. Appearance criteria may be configured to control when markers display within an XR environment. Appearance criteria may cause a marker to become visible or remain visible based on fulfillment of a predetermined condition. The predetermined condition may be set by the XR author and may be based on threshold environmental data, such as a threshold temperature, a threshold noise level, a threshold light intensity, a threshold moisture level, a threshold odor intensity, or any other pertinent data. Alternatively, or additionally, the predetermined condition may be based on an application user being within a predetermined proximity of a physical object within the XR environment.

Activation criteria may be configured to control when the virtual content associated with a marker is displayed within the XR environment. In some examples, the activation criteria may comprise of a gesture performed by an application user that is interacting with an XR template within the XR environment. Activation criteria may be configured to reveal virtual content, forgo a presentation of virtual content, or dismiss a presentation of a marker, altogether. While activation criteria may correspond to a gesture performed by an application user, other types of activation criteria are possible. For example, activation criteria may be based on one or more of an audible command, time of day, temperature data, light intensity data, moisture data, noise data, weather data, odor data, or any other form pertinent data deemed relevant by an XR author.

The device optimization component 224 is configured to optimize the resolution of assets (i.e. markers and virtual content) depending on the viewing technology of the XR environment-enabled client device. In other words, the device optimization component 224 may determine the resolution capability of an XR environment-enabled client device and further optimize a presentation of an XR template based on the determined capability.

The asset class component 226 may dynamically generate asset classes of virtual content, appearance criteria, and activation criteria that relate to a common marker (i.e. physical object) within an XR template. A common marker may correspond to instances of the same type of physical object or virtual object. An asset class may include virtual content, appearance criteria (i.e. markers) and activation criteria (i.e. virtual content). By grouping together virtual content and corresponding criteria that relate to the same type of physical or virtual object, the asset class component 226 can simplify the proliferation of virtual content with the XR environment.

Further, the asset class component 226 may further generate a sub-asset class to account for variations in a type of physical object or virtual object within an XR environment. Thus, a physical object 'B' that differs slightly from physical object 'A' may be represented by an asset class of physical object 'A' and a sub-asset class that accounts for the differences between physical object 'A' and 'B'.

The data store 228 may be accessed by a data management system and may be configured as a relational database, an object-oriented database, a NoSQL database, a columnar database, or any other database configuration capable of supporting scalable persistence. In one example, data store 228 may store XR templates generated or modified by one or more XR authors. The data store 228 may further include third-party templates uploaded from third-party data repositories.

Figure 3:
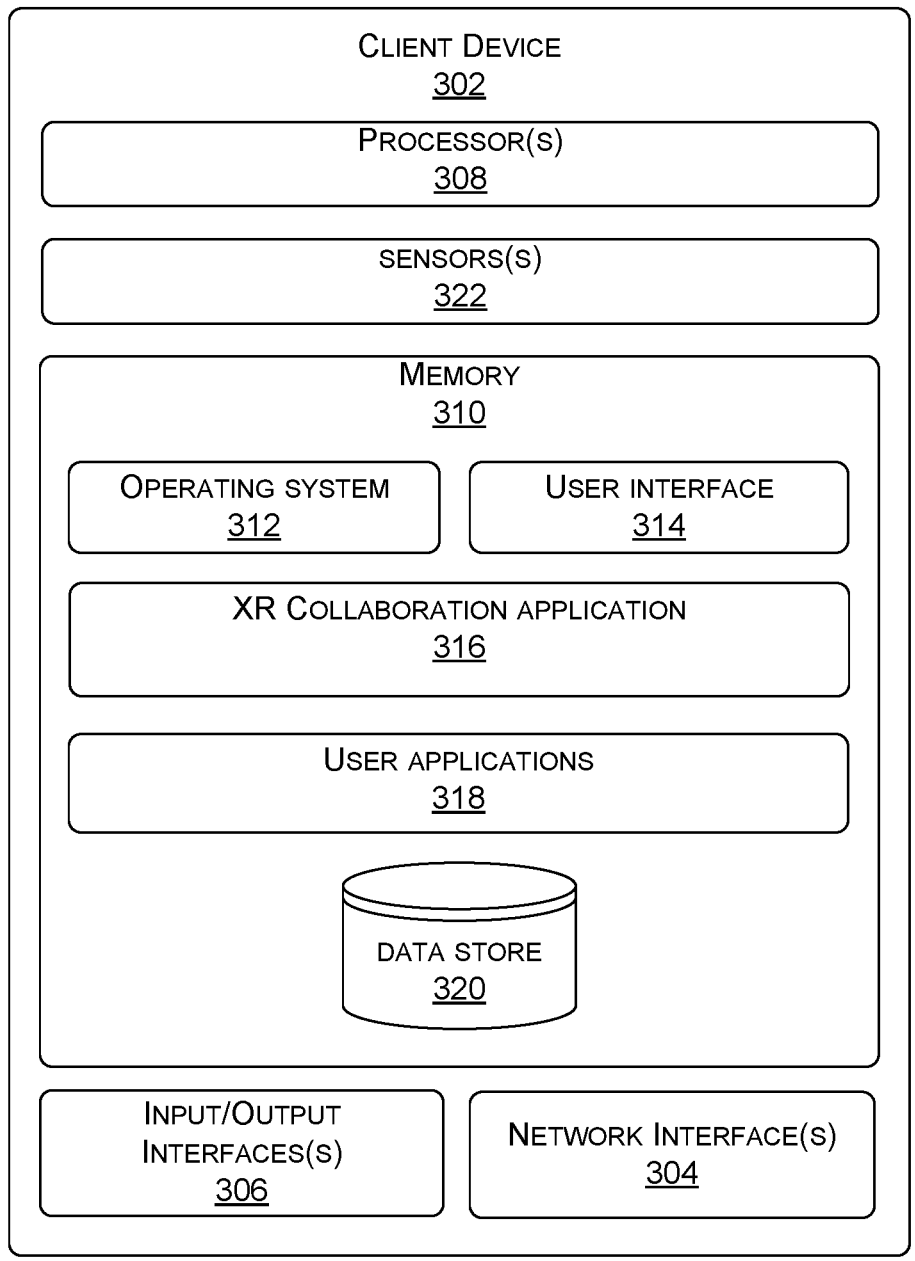
FIG. 3 illustrates a block diagram of various components of a client device that executes an XR collaboration application.

FIG. 3 illustrates a block diagram of various components of a client device that executes an XR collaboration application. The client device 302 may correspond to client device 104. Particularly, the client device 302 may be communicatively coupled to an XR collaboration system 106 or a corresponding, cloud infrastructure 116 via one or more network interface(s) 304. Network interface(s) 304 may be similar to network interface(s) 206 and include any sort of transceiver in the art. The input/output interface(s) 306 may be similar to input/output interface(s) 204 and include any type of input or output interface known in the art.

In the illustrated example, the client device 302 may further include one or more processor(s) 308 operably connected to memory 310. The one or more processor(s) 308 may be similar to the one or more processor(s) 208, and the memory 310 may be similar to memory 210.

Moreover, the memory 310 may include an operating system 312, a user interface 314, an XR collaboration application 316, and user application(s) 318. The operating system 312 may be used to implement the user application (s) 318 and the XR collaboration application 316. The operating system 312 may be any operating system capable of managing computer hardware and software resources. Further, the user application(s) 318 and the XR collaboration application 316 may include routines, program instructions, objects, and/or data structures that perform particular tasks or implement particular abstract data types. The user application(s) 318 may correspond to any executable application on the client device 302. The XR collaboration application 316 may correspond to the XR collaboration application 216. Further, the data store 320 may correspond store XR templates generated The client device 302 may further include one or more sensor(s) 322 for detecting environmental data associated with the client device. The one or more sensors 322 may include, but are not limited to, a Global Positioning System (GPS) sensor, a light sensor, a microphone to detect ambient noise, an olfactory sensor, a moisture sensor, or a temperature sensor.

Figure 4:
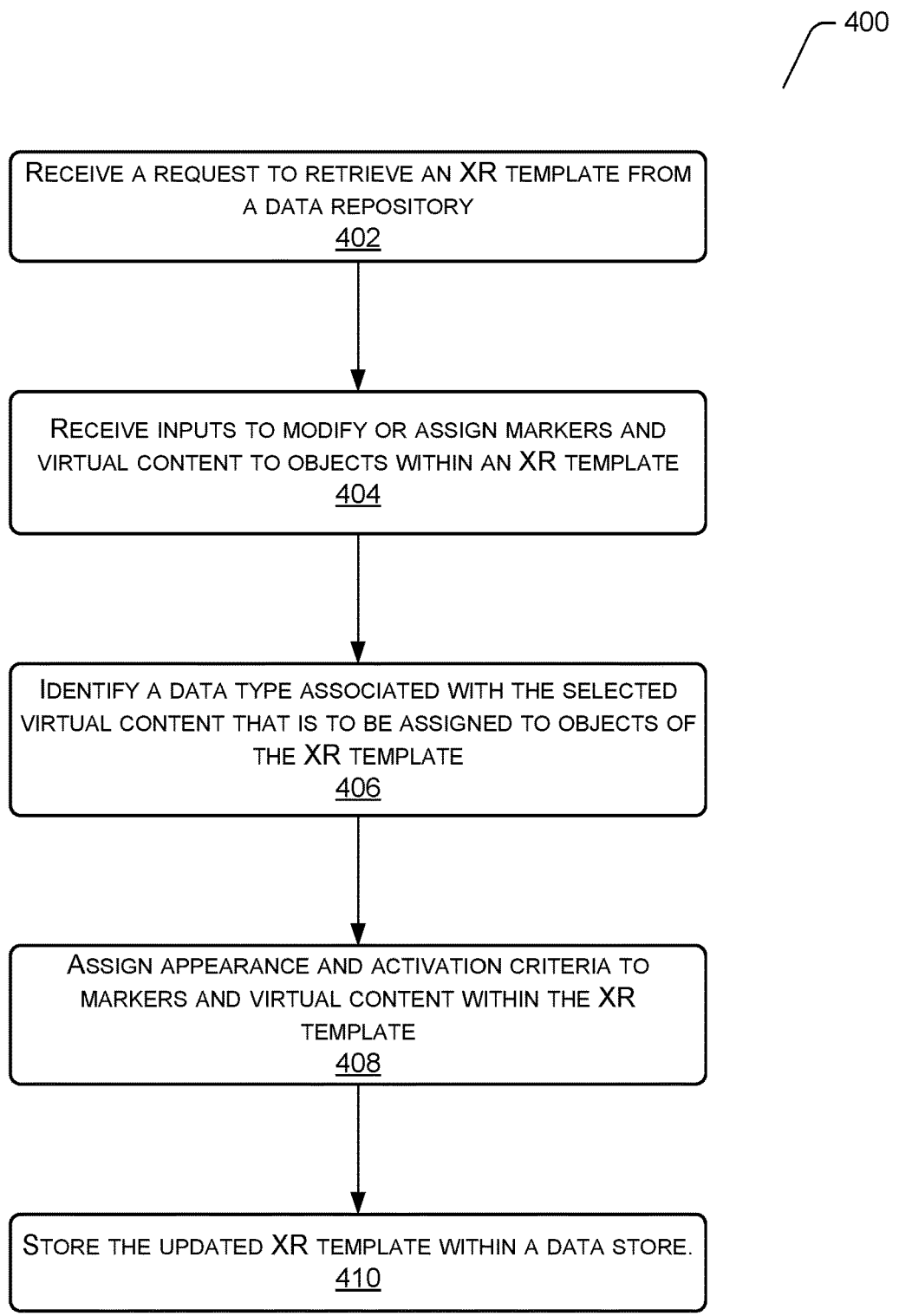
FIG. 4 illustrates a process for an XR author modifying marker behavior and virtual content during runtime and to retain these changes for future activations of the marker and corresponding virtual content within an XR template.
Figure 5:
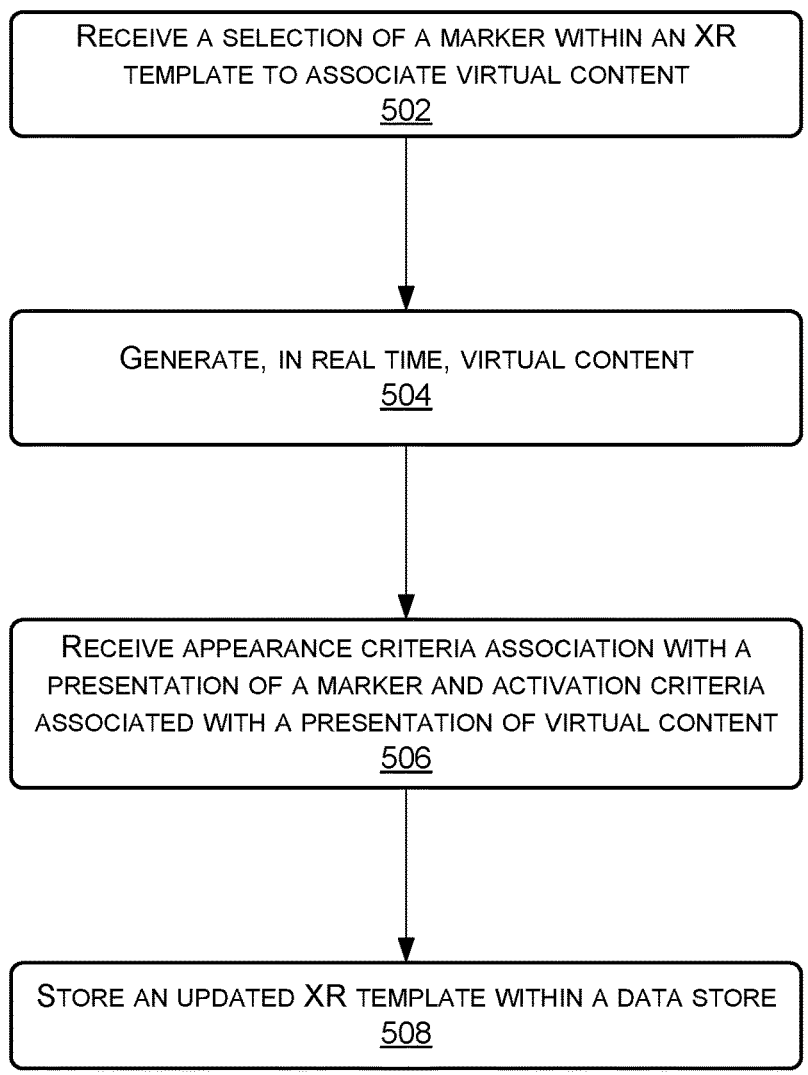
FIG. 5 illustrates a process for generating virtual content in real-time and further associating with virtual content with an XR template.
Figure 6:
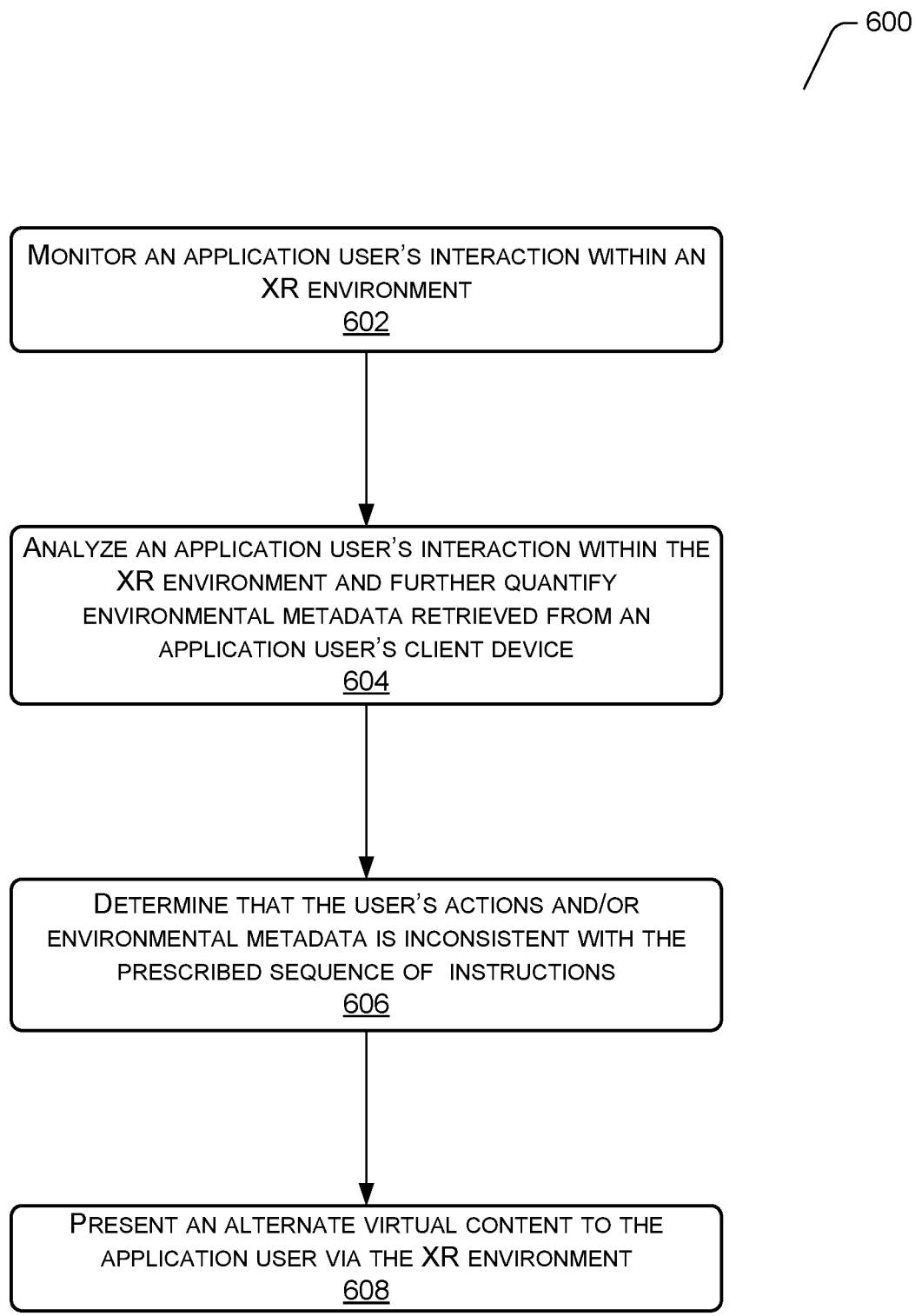
FIG. 6 illustrates a process for monitoring an application user's interaction within an XR environment and dynamically selecting virtual content based on situational awareness of the application user's interaction.

FIGS. 4, 5, and 6 present processes 400, 500, and 600 that relate to operations of the XR collaboration application. Each of processes 400, 500, and 600 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400, 500, and 600 are described with reference to the computing environment 100 of FIG. 1.

FIG. 4 illustrates a process for an XR author modifying marker behavior and virtual content during runtime and to retain these changes for future activations of the marker and corresponding virtual content within an XR template. In various examples, an XR author, via the XR collaboration application, may set appearance criteria that control the presentation of a marker within an XR environment. More specifically, appearance criteria may include an order that one or more markers appear. By way of example, appearance criteria may denote that marker A may display before marker B, but marker B may not display before marker A.

At 402, the XR collaboration application may receive from an XR author a request to retrieve an XR template from a data repository. In this example, the XR collaboration application may be native to a client device associated with the XR author. In one example, the XR collaboration application may retrieve the XR template from a data repository native to the client device associated with an XR author. Alternatively, the data repository may be native to a remote server, a cloud-based infrastructure, or a third-party data repository.

In one example, the XR template may include preset markers, virtual content, and one or more rules (i.e. appearance and activation rules). Accordingly, an XR author may modify the XT template rather than creating or adopting new markers or virtual content. Alternatively, the XR template may not include any preset markers, virtual content, or rules.

At 404, the XR collaboration application may receive inputs from the XR author to modify or assign markers and virtual content to physical or virtual objects within an XR template. In one example, the XR author may access pre-existing markers and virtual content to associate with the XR template. The pre-existing markers and virtual content may be stored as an asset class or sub-asset class associated with physical or virtual objects within the XR template. Particularly, the XR author may access a database of sub/asset classes via a menu or a searchable user interface element of a corresponding client device. In one example, the XR author may interact with the menu or search user-interface element by motioning predefined gestures via a corresponding client device that is enabled for the environment.

At 406, the XR collaboration application may identify a data type associated with the selected virtual content that is to be assigned to objects of the XR template. In doing so, the XR collaboration application may render the virtual content within the XR template based on a corresponding file type. For example, the XR collaboration application may identify a data type of the virtual content as a Uniform Resource Locator (URL), and in doing so, retrieve the Hypertext Markup Language (HTML) associated with the virtual content. The XR collaboration application may further truncate the HTML based on the start and end and further associate the truncated HTML with a corresponding marker within the XR template. Alternatively, the data type of the virtual content may correspond to a data file, and the XR collaboration application may render the file within the XR template based on a corresponding file extension (i.e. text file, image file, audio file, or video file).

At 408, the XR collaboration application may assign appearance and activation criteria to markers and virtual content within the XR template. The appearance criteria may control the presentation of markers within the XR template, and the activation criteria may control the presentation of virtual content that is associated with each marker. In one example, the XR author may input the appearance and activation criteria via an XR collaboration application. In another example, the appearance and activation criteria may have been predetermined as part of an asset class or sub-asset class that is retrieved from a database. In the latter example, the XR author may modify or accept the predetermined appearance and activation criteria.

At 410, the XR collaboration application may store the updated XR template within a data store. In one example, the data store may be native to a client device of the XR author. Alternatively, or additionally, the updated XR template may be uploaded to a remote server or cloud infrastructure to ensure that the updated XR template is accessible by other XR authors or application users.

FIG. 5 illustrates a process for generating virtual content in real-time and further associating with virtual content with an XR template.

At 502, the XR collaboration application may receive a selection of a marker within an XR template to associate virtual content. Continuing with a previous example of providing a checklist of maintenance steps for a Mud Pump, the marker selection may correspond to the Mud Pump itself, or a component thereof.

At 504, the XR collaboration application may record virtual content as it is performed or viewed by the XR author, in real time. The virtual content may correspond to text-based or audio-based annotations of maintenance steps for the Mud Pump. Alternatively, the virtual content may comprise of a video of the maintenance steps being performed.

In one example, the XR author may elect to create multiple instances of virtual content that each represents variations of performing a sequence of maintenance steps. Some sequences may represent an improper sequence of performing maintenance instructions. The purpose of doing so is twofold. First, by recording virtual content of improperly executed instructions, the XR collaboration application may use the virtual content as a template to later identify an application user performing the same incorrect sequence of instructions. Further, in response to identifying an application user performing an incorrect sequence of steps (i.e. marker B before marker A), the XR collaboration application may dynamically and in real-time, present the application user with virtual content that corrects the improper sequence of instructions, as defined earlier by the XR author.

At 506, the XR collaboration application may receive appearance criteria associated with a presentation of the marker and activation criteria associated with a presentation of virtual content. The appearance criteria may indicate that one marker may only appear in response to a prerequisite marker having been activated and its respective virtual content, viewed.

At 508, the XR collaboration may store the updated XR template within a data store. In one example, the data store may be native to a client device of the XR author. Alternatively, or additionally, the updated XR template may be uploaded to a remote server or cloud infrastructure to ensure that the updated XR template is accessible by other XR authors or application users.

FIG. 6 illustrates a process for monitoring an application user's interaction within an XR environment and dynamically selecting virtual content based on situational awareness of the application user's interaction. In some examples, situational awareness may reflect a change in environmental data (i.e. temperature, light intensity, noise intensity, moisture, and/or so forth) or an indication that the application user is performing an improper sequence of maintenance instructions.

At 602, the XR collaboration application may monitor an application user's interaction within an XR environment, based on an XR template. In various examples, the XR collaboration application may monitor movements of the application user relative to physical objects within the XR environment to determine whether the application user is performing a proper sequence of maintenance instructions. Further, the XR collaboration application may monitor environmental data to determine whether a warning or an alternate set of maintenance steps (i.e. virtual content) may be required based on the environmental data.

At 604, the XR collaboration application may use one or more trained machine learning algorithms to analyze an application user's interaction within the XR environment, and further quantify environmental data retrieved from the application user's client device. In one example, the XR collaboration may correlate the application user's movements within the XR environment with those performed on the video captured by the XR author when generating the XR template.

At 606, the XR collaboration application may determine that the user's actions and/or environmental data are inconsistent with the prescribed sequence of maintenance instructions. In doing so, the XR collaboration application may identify an alternate set of virtual content (i.e. alternate maintenance instructions) for presentation to the application user within the XR environment.

The XR collaboration application may identify the alternate set of maintenance instructions by iterating through instances of maintenance steps that were recorded as part of generating virtual content for the XR template.

At 608, the XR collaboration application may dynamically present the alternate virtual content to the application user via the XR environment. The alternate set of virtual content may correspond to maintenance steps that correct an improper sequence of instructions. Alternatively, or additionally, the alternate set of virtual content may warn the application user of irregular environmental data and selectively provide an alternate set of maintenance steps congruent with the irregular environmental data.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
    retrieving an XR template from a data repository, the XR template corresponding to a real-world and a virtual world representation of a select environment;
    receiving, via a client device, an input to assign a marker to an object depicted within the XR template;
    capturing, via the client device, virtual content to be associated with the marker;
    associating the virtual content with the marker;
    generating an appearance criterion that controls a display of the marker within the XR template;
    generating an activation criterion that controls a display of the virtual content that is associated with the marker;
    updating the XR template to create an updated XR template, the updated XR template including the marker, the appearance criterion, the activation criterion, and the virtual content;
    storing the updated XR template;
    generating an asset class that groups the virtual content, the appearance criterion, and the activation criterion that is associated with the marker;
    identifying additional objects within an XR environment of the updated XR template that correspond to a same type of object as the object;
    assigning the asset class to the additional objects, and
    wherein, the updated XR template is configured to include assigning the asset class to the additional objects.

2. The computer-implemented method of claim 1, wherein the updated XR template is further configured to display the virtual content in response to the display of the marker.

3. The computer-implemented method of claim 1, further comprising:
    determining that the input correspond to a gesture performed by a user of the client device;
    analyzing the gesture by identifying a correlation with stored gestures, and
    determining that the gesture corresponds to assigning the marker to the object depicted within the XR template, based at least in part on analysis of the gesture.

4. The computer-implemented method of claim 1, further comprising:
    updating the XR template to include the activation criterion, the activation criterion corresponding to an audible command, wherein the updated XR template is configured to present the virtual content associated with the marker, based at least in part on fulfillment of the activation criterion.

5. The computer-implemented method of claim 1, wherein the client device is a first client device, and wherein the appearance criterion corresponds to a user's client device being within a predetermined distance of the object associated with the marker, and further comprising:
    capturing, from a second client device, a geographic location of the second client device within an XR environment of the updated XR template;
    determining that the geographic location of the second client device is within the predetermined distance of the object associated with the marker; and
    causing display of the marker within the second client device.

6. The computer-implemented method of claim 1, wherein the client device is a first client device, and further comprising:
    capturing, from a second client device, a gesture performed by a user of the second client device;
    analyzing the gesture by identifying a correlation with stored gestures;
    determining that the gesture corresponds to an activation criterion that controls display of the virtual content that is associated with the marker; and
    causing display of the virtual content, based at least in part on analysis of the gesture.

7. The computer-implemented method of claim 1, wherein the XR template is associated with a plurality of instructions to maintain serviceability of a physical object, and further comprising:
    generating the activation criterion for instances of the virtual content, based at least in part on an order of the plurality of instructions, wherein individual instances of the virtual content correspond to individual instruction to maintain the serviceability of the physical object, and
    wherein, the updated XR template further includes the activation criterion for the instances of the virtual content.

8. One or more non-transitory computer-readable media storing computer-executable instructions that, when executed on one or more processors, cause the one or more processors to perform acts comprising:
    retrieving an XR template from a data repository, the XR template corresponding to a real-world and a virtual world representation of a select environment;
    receiving, via a client device, an input to assign a marker to a physical object depicted within the XR template;
    assigning, via the client device, virtual content to the marker;
    generating an appearance criterion that controls a display of the marker within an XR environment of the XR template;
    generating activation criterion that controls a display of the virtual content associated with the marker;
    updating the XR template to create an updated XR template, the updated XR template including the marker, the appearance criterion, the activation criterion, and the virtual content;

storing the updated XR template;

generating an asset class that groups the virtual content, the appearance criterion, and the activation criterion that is associated with the marker;

identifying additional physical objects within the XR environment of the updated XR template that correspond to a same type of physical object as the physical object;

assigning the asset class to the additional physical objects, and wherein, the updated XR template is configured to include assigning the asset class to the additional physical objects.

9. The one or more non-transitory computer-readable media of claim 8, wherein the appearance criterion corresponds to at least one of a threshold temperature, a threshold noise level, a threshold light intensity, a threshold moisture level, or a threshold odor intensity.

10. The one or more non-transitory computer-readable media of claim 8, wherein the activation criterion corresponds to a gesture performed by an application user accessing the updated XR template, the activation criterion further configured to reveal the virtual content, forgo a presentation of the virtual content, or dismiss the display of the marker.

11. The one or more non-transitory computer-readable media of claim 8, wherein the virtual content corresponds to at least one of a video data file, an image file, or an audio file.

12. A system comprising:

one or more processors;

memory coupled to the one or more processors, the memory including one or more modules that are executable by the one or more processors to:

retrieve an XR template from a data repository, the XR template corresponding to a real-world and a virtual world representation of a select environment;

receive, via a client device, an input to assign a marker to a physical object depicted within the XR template;

assign, via the client device, virtual content to the marker;

generate appearance criterion that control a display of the marker associated with the physical object;

generate activation criterion that controls a display of the virtual content associated with the marker;

update the XR template to create an updated XR template, the updated XR template including the marker, the appearance criterion, the activation criterion, and the virtual content;

storing the updated XR template;

generating an asset class that groups the virtual content, the appearance criterion, and the activation criterion that is associated with the marker;

identifying additional physical objects within an XR environment of the updated XR template that correspond to a same type of physical object as the physical object;

assigning the asset class to the additional physical objects, and wherein, the updated XR template is configured to include assigning the asset class to the additional physical objects.

13. The system of claim 12, wherein the activation criterion is based at least in part on a predetermined proximity of the client device to the physical object depicted within the updated XR template.

14. The system of claim 12, wherein the marker corresponds to a graphical representation that overlays the physical object depicted within the XR template.

* * * * *